(12) United States Patent  
Fotev

(10) Patent No.: US 8,907,953 B2  
(45) Date of Patent: Dec. 9, 2014

(54) UNFOLDING DATASET WITH ON-DEMAND RESOLUTION ON A NON-LINEAR FIXED LENGTH GRAPH AXIS

(76) Inventor: Krassimir Fotev, Harrison, NJ (US)

( * ) Notice: Subject to any disclaimer, the term of this patent is extended or adjusted under 35 U.S.C. 154(b) by 724 days.

(21) Appl. No.: 13/154,688

(22) Filed: Jun. 7, 2011

(65) Prior Publication Data

US 2011/0304626 A1     Dec. 15, 2011

Related U.S. Application Data

(60) Provisional application No. 61/353,044, filed on Jun. 9, 2010.

(51) Int. Cl.  
  *G06T 11/20* (2006.01)  
  *G06F 17/24* (2006.01)

(52) U.S. Cl.  
  CPC ............ *G06T 11/206* (2013.01); *G06F 17/246* (2013.01)  
  USPC ........................................................ 345/440

(58) Field of Classification Search  
  None  
  See application file for complete search history.

(56) References Cited

U.S. PATENT DOCUMENTS

| | | | |
|---|---|---|---|
| 3,577,854 A * | 5/1971 | Felix ............................... 33/1 C |
| 6,219,052 B1 * | 4/2001 | Gould ............................. 345/661 |
| 7,348,981 B1 * | 3/2008 | Buck ............................. 345/440.2 |
| 2002/0113605 A1 * | 8/2002 | De Maaijer et al. .......... 324/679 |
| 2004/0196286 A1 * | 10/2004 | Guzik ............................. 345/440 |
| 2005/0228735 A1 * | 10/2005 | Duquette ......................... 705/37 |
| 2006/0282179 A1 * | 12/2006 | Mauro ............................. 700/56 |
| 2007/0214027 A1 * | 9/2007 | Maeckel et al. .................. 705/7 |
| 2008/0043120 A1 * | 2/2008 | Mitsunaga .................... 348/238 |
| 2008/0115079 A1 * | 5/2008 | Mather ........................... 715/774 |
| 2008/0140559 A1 * | 6/2008 | Ram et al. ....................... 705/37 |

OTHER PUBLICATIONS

Jon Peltier, "Logarithmic Axes in Excel Charts", Peltier Tech Blog, Aug. 25, 2009, URL: http://peltiertech.com/WordPress/logarithmic-axes-in-excel-charts/.*

* cited by examiner

*Primary Examiner* — David H Chu  
(74) *Attorney, Agent, or Firm* — Leason Ellis LLP

(57) ABSTRACT

A system and method are provided for unfolding large datasets with an on demand resolution in one or more points of interest on a non-linear fixed length graph axis. The system includes one or more integrable function families configured to provide one or more integrable functions. The system further comprises a client application configured to capture and/or evaluate data unfold resolution requirements, adjust the axis resolution in a point-by-point fashion while preserving the physical axis dimensions, render axis tickmarks, adjust the axis upon data point selection, and display the selection to the user.

34 Claims, 4 Drawing Sheets

UNFOLDING DATASET WITH ON-DEMAND RESOLUTION ON A NON-LINEAR FIXED LENGTH GRAPH AXIS

CROSS-REFERENCE TO RELATED APPLICATIONS

The present application claims the benefit of U.S. patent application Ser. No. 61/353,044, filed Jun. 9, 2010, which is hereby incorporated by reference in its entirety.

TECHNICAL FIELD OF THE INVENTION

The present invention relates to improvements in navigating data on fixed length graph axis. More particularly, the present invention relates to unfolding and navigating a large dataset with an on-demand resolution at the one or more points higher than the linear scale resolution while keeping the physical length of the axis constant.

BACKGROUND OF THE INVENTION

When presenting a large set of data on a digital screen, in case the number of options exceed the physical screen resolution, one can choose between two options if the axis scale remains linear: fix the axis resolution (1 over items per axis pixel) and allow for dataset dependent physical axis dimensions; or fix the physical dimensions of the axis and allow for floating with the dataset (diminishing as the dataset size increases) axis resolution.

In the former case, with a large dataset as defined by the minimum and the maximum members, and uniform resolution typically bound to the maximum dataset density around a particular dataset point, the axis length may grow bigger than the screen size. To allow navigating to any point on the axis, one creates a scrollable viewport, using a rendering scrollbar, navigation arrows, etc. Scrollable viewports may disorient the user, and do not lead to an effective user experience, considering the need to frequently click navigation arrows or drag a scrollbar, prior to making an actual selection on the graph axis.

In the latter case, the inconvenience of having to deal with a scrollable viewport is replaced by the frustrating experience of not being able to select the exact data point of interest on the axis. With shrinking physical axis dimensions or increasing dataset size (or maximum dataset density around the point of interest), the diminishing resolution renders this scenario real.

One solution to this problem is suggested by U.S. patent application 2007/0179952 A1 to David J Vespe et al. The solution presented therein uses item stacks where the axis resolution is below the threshold needed to be able to select an individual dataset item. While practical in many cases, the initial axis resolution dilemma is still present as the real estate needed to render the stacks is quickly exhausted, i.e. the axis resolution becomes smaller and smaller.

To summarize, the existing prior art in this technology area presents the following disadvantages:
(a) Users must choose between small (poor) resolution or a large physical axis
(b) User experience suffers in the small resolution case, because the user cannot properly examine a data point of interest. This is due to the digital device not being able to distinguish between data-points falling onto the same display pixel.
(c) In case of a device having sufficient resolution and an axis longer than the physical screen dimensions, scrollable viewports disorient the user, given that the minimum and maximum axis reference points are frequently out of sight. The use of navigation buttons or scrollbar thumbs, constantly changes the position of the reference points and contributes to the disorientation and bad experience.
(d) One or more of the proposed solutions merely delay facing the same problem as the axis resolution diminishes.

It is with respect to these and other considerations that the disclosure made herein is presented.

SUMMARY OF THE INVENTION

The invention provides a system for building a non-linear graph axis, with on-demand resolution at one or more points, capable of unfolding large datasets stored in computer physical memory. The system comprises one or more integrable function families configured to provide one or more integrable functions. Furthermore, the system comprises a client application configured to capture and/or evaluate resolution requirements for data unfolding, adjust the axis resolution point-by-point while preserving the physical axis dimensions; render axis tickmarks; adjust the axis upon the selection of a data point; and display the selection to the user.

The invention provides a method for building one or more non-linear graph axes, each having on-demand resolution at one or more points along the axes, the axes capable of unfolding large datasets, while keeping the physical dimensions of the axes constant. The method comprises identifying one integrable function from among a family of integrable functions; adjusting the axis resolution point-by-point by following the identified integrable function; rendering axes tickmarks and labels; adjusting the axes upon data-point selection; and displaying the selection to the user.

The invention further provides a computer-readable medium containing instructions executable by a processor for performing a method for building one or more non-linear graph axes with on-demand resolution at one or more points along the axis. The method comprises: identifying one integrable function from among a family of integrable functions; adjusting the axis resolution point-by-point by following the identified integrable function; rendering axis tickmarks and labels; and adjusting the axis upon data-point selection.

These and other objects and features of the present invention will become more fully apparent from the following description and appended claims, and/or may be learned by the practice of the invention as set forth hereinafter.

Figure 1A:
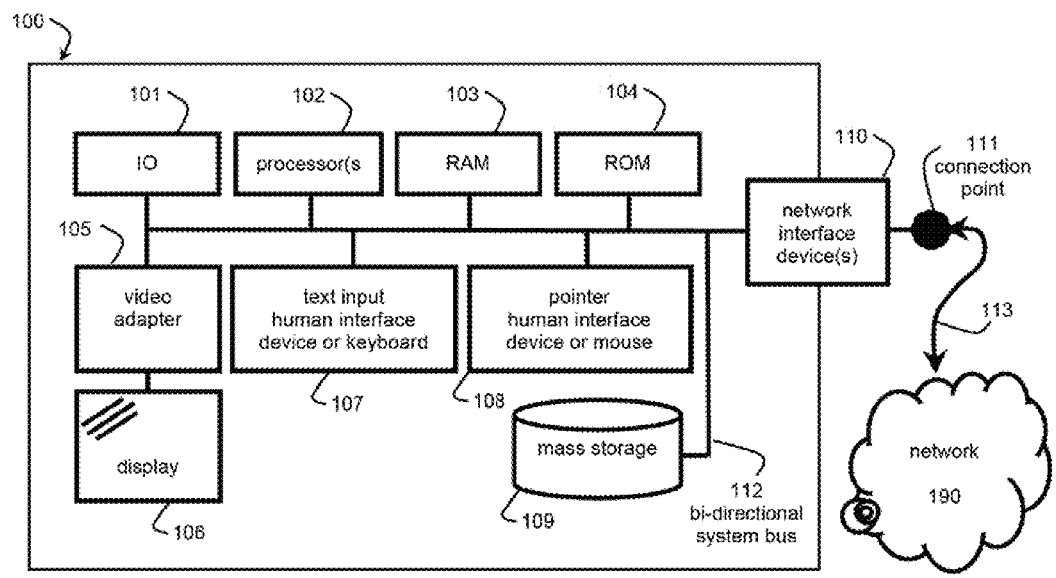
FIG. 1A is a bock diagram illustrating an embodiment of a computing device in which the embodiment of the present invention can be implemented.

DRAWINGS-REFERENCE NUMERAL 100-a computing device
101-I0 (input/output) unit
102-processor (one or more central processing units)
103-RAM (random access memory) where runtime application state is being kept
104-ROM (read only memory) assisting the system startup and diagnostics
105-Video adapter
106-Graphical display
107-A human interface text input device; typically a keyboard
108-A human interface-pointing device: typically a mouse
109-mass storage where operating system and application data is being persisted
110-one or more network interface devices
111-connection points exposed by one or more network devices
112-bi-directional system bus
113-network link
120, 121, 122-servers
130-a wireless router
140, 141-mobile phones
150-a network enabled gaming device
160, 161, 162, 163-computing workstation devices
190-a network the network interface may send data to and receive data from
191-a public network
192-a public mobile phone network
200-a linear uniform resolution axis with tickmark positions circled
201-modulating Gauss function during first iteration
202-the integral of (the area covered by) the particular Gauss function in the axis range.
203-modulating Gauss function at the last iteration
204-the integral of (the area covered by) the modulating Gauss function at the last iteration. The two areas below axis compensate for the area above axis, i.e. the integral reaches 0 for this particular Gauss modulation function in the axis range
205-the nonlinear, Gauss function modulated axis with tickmark positions circled
206-between nonlinear axis tickmarks 6 and 7 (counting from left to right), one may count total of four tickmarks from the linear axis; the area is circled
207-the axes bundle: linear uniform resolution axis 200, non-linear modulated 205, and axis the modulations function 201 integrates over
300-a web browser
301-a web page within the browser, with an alternative script invention embodiment
302-linear axis
303-non-linear axis with resolution adjusted with trapezoid like modulation function; nonlinear axis tickmarks are visible
304-the focus area; pointing device movement over either axis being converted to an actual date time value
400-Choose a minimum targeted resolution and focal point
401-Use dataset knowledge estimating linear axis size
402-Does the linear axis fit the area available? (logical block)
403-Display linear axis
404-Choose a resolution modulation functional family
405-Does the functional family allow for analytical solution? (logical block)
406-Solve numerically following iterative approach and get modulation function -continued

DRAWINGS-REFERENCE NUMERAL instance
407-Solve with simple formulas and get modulation function instance
408-Adjust axis resolution point-by-point with the modulation function
409-Calculate non-linear axis tickmark positions
410-Display tickmarks
411-Display associated with the focal point data
412-Wait for user intput
413-Calculate the value of the new focal point given the axis linear offset

DETAILED DESCRIPTION OF CERTAIN EMBODIMENTS OF THE INVENTION

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather these embodiments are provided so that this disclosure will satisfy applicable legal requirements. Like numbers refer to like elements throughout.

A first embodiment of the invention is described with reference to FIGS. 1A, 1B, and 2.

Embodiments of the invention described herein are generally directed to a computer-implemented system and a method for building non-linear graph axes, capable of unfolding large datasets, with on-demand resolution at one or more points along the axes, while keeping the dimensions of the physical axes constant.

FIG. 1A is a block diagram illustrating an embodiment of a computing device 100 in which an embodiment of the present invention can be implemented. The computing device 100 can be a general-purpose computing device such a personal computer, a laptop, a Personal Desktop Assistant (PDA), a mobile phone and so forth. A human-interface pointing device such as a mouse 108 and/or a human-interface text input device such as a keyboard 107 are preferably coupled to a bi-directional system bus 112. The human-interface devices 107 and 108 can preferably enable a user to provide input to the computing device 100 and communicate the input to a processor 102. Other suitable input devices can be used in addition to, or in place of, the mouse 108 and the keyboard 107. An I/O (Input/Output) unit 101 coupled to the bi-directional system bus 112 represents I/O systems such as a printer (not shown), an A/V (audio/video) I/O (not shown), etc.

The computing device 100 includes a video adapter 105 with its own or shared video memory (not shown), a Random Access Memory (RAM) 103 where both an application comprising computer readable code and an application state are stored at runtime, a Read Only Memory (ROM) 104 that is generally responsible for keeping system start-up computer readable code, a mass storage device 109, all coupled with the bi-directional system bus 112 along with the I/O 101, the processor 102, the keyboard 107, and the mouse 108. The mass storage device 109 can include both fixed or removable media, such as magnetic, optical, flash memory and any other available mass storage technology implementation. The computing device 100 can have an embedded and/or external video display adaptor 105 capable of presenting graphical and textual information to the user. A display 106 can connect to the video adapter 105 through a video amplifier (not shown). The video amplifier is well known in the art. One or more circuits convert digital pixels to a raster signal suitable for use by the display 106 that on its part displays a graphical image.

The computing device 100 can also include a network interface device 110 coupled to the bus 112. The network interface device 110 provides a two-way data communication coupling via a network link 113 through the device connection point 111. For example the network interface 110 can be a modem, a local area network (LAN) card, or a radio device. In any such implementation the network interface device 110 sends or receives electrical, electromagnetic or optical signals that carry digital data streams representing various types of information. More than one network interface devices 110 can be used. For example a Local Area Network (LAN) card can connect a computer workstation to the Internet (through an Internet Service Provider), while a wireless card can connect the workstation to a mobile device like a wireless enabled gaming device for instance.

The computing device 100 can send and receive data, including program code or web documents through the network link 113, the connection point 111, the network interface device 110 and the bus 112 to the processor 102 and then to the memory modules. The data received may be executed by the processor 102 and/or stored to the mass storage device 109.

Figure 1B:
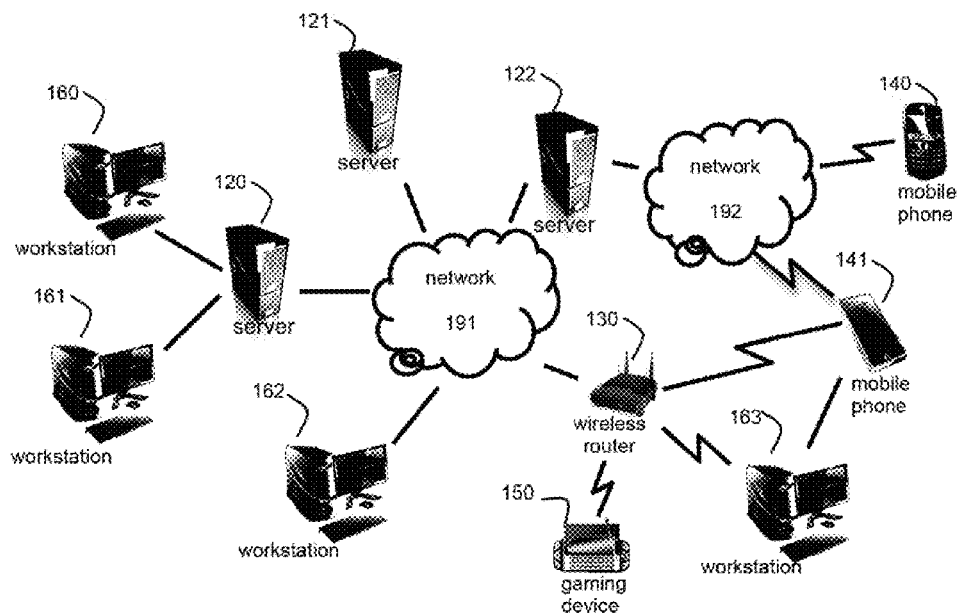
FIG. 1B is a diagram illustrating a typical distributed system in which an embodiment of the present invention can be implemented.

FIG. 1B is a diagram illustrating a typical distributed system in which an embodiment of the present invention can be implemented. As illustrated in FIG. 1B, the system includes a network setup with various types of computing devices linked through network interface components. For instance, computer workstation devices 160 and 161 connect to a public network 191 through a gateway or a proxy server 120. A computing device 162 and a server 121 are directly linked to the network 191. A server 122 bridges the network 191 to a public wireless network 192. Through a public network 192, mobile phone devices 140 and 141 connect to each other or access resource of the public network 191, for example, the server 121. A wireless router 130 enables the mobile phone 141 to connect to a home or office local network. The wireless router 130 establishes a communication channel among a wireless network enabled gaming device 150, a workstation 163, and the mobile phone 141. Further, the mobile phone 141 may be connected through wired interface of a Universal Serial Bus (USB) to the workstation 163. The computing devices can receive and send data between each other by using the various network interfaces discussed above. In case of a web document, the processor 102 processes the data of the web document by using a computer application code commonly referred to as an Internet browser. Most modern network-enabled end-point computing devices include at least a basic browser implemented and available as an application code on them.

Application code may be embodied in any form of computer product. A computer program comprises a medium configured to store or transport computer readable code or data, or in which computer readable code or data can be embedded. Some examples of computer product include CD-ROM discs, DVD disks, ROM cards, computer hard drives, servers on a network, carrier waves, and other removable media. An embodiment of the invention can be implemented as computer software in the form of computer readable code execute in a general-purpose computing device.

The computing device systems described above are for the purposes of example only. The current and the alternative embodiments of the non-linear graph axes, capable of unfolding large datasets, with on-demand resolution at one or more points can be implemented in practically any type of computing device capable of rendering textual and/or graphical document data.

Figure 2:
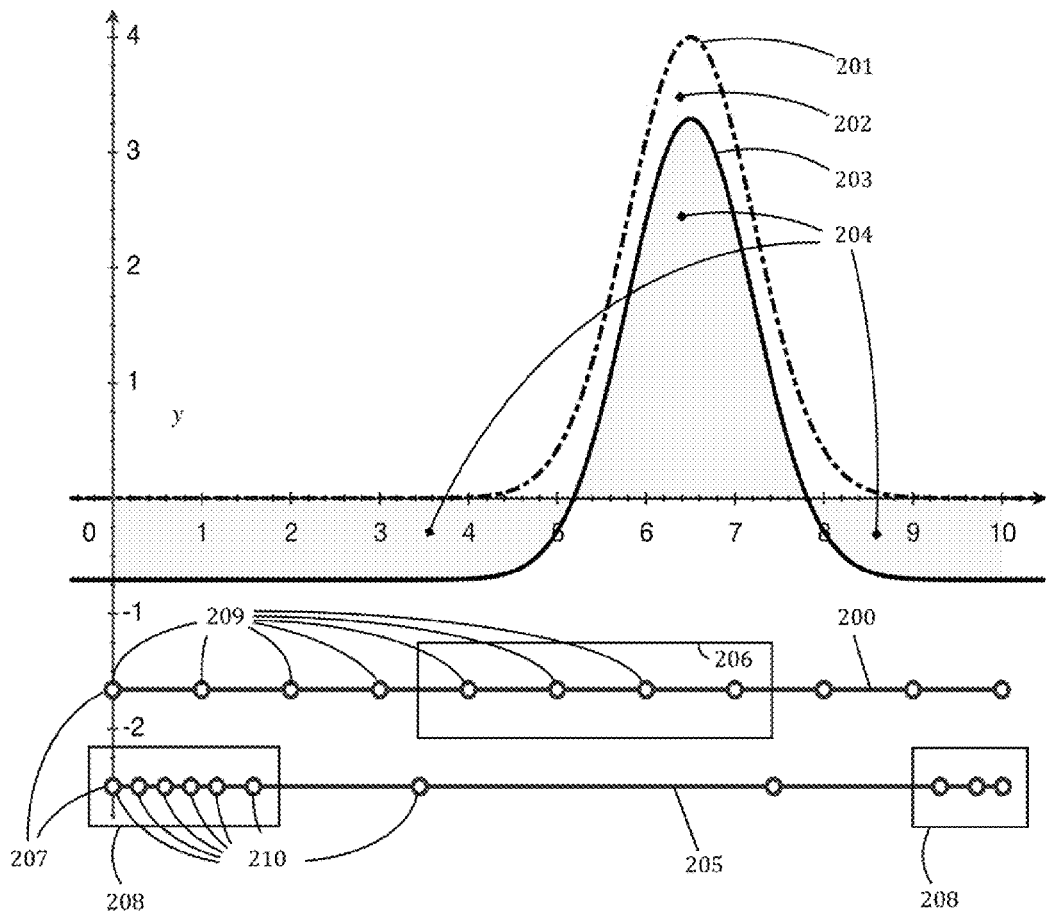
FIG. 2 illustrates initial linear axis state, the iteration approach in adjusting the resolution at the focal point, and the end non-linear axis state after the resolution modulation.

FIG. 2 illustrates one embodiment of a typical non-linear axis 205 that allows for on-demand resolution 206 at its focal point. The desired resolution at the focal point 207 is preferably preset to be 4 fold the resolution that the underlying linear axis 200 has to offer, though it should be understood that in alternative embodiments various other degrees of resolution can be similarly implemented. In order to maintain a constant axis physical length, the increase at the focal point resolution 206 is offset by reducing the resolution and the resulting demand for real estate (that is, a pixel area of a screen/display) for data points located away from the focal point 208. Resolution is generally modulated by an integrable, mildly varying function, preferably with just one local maximum in the one or more points of interest. For example, if $x_0$, $x_1$ denote the axis minimum and axis maximum values respectively, and $l_{linear}$ is the axis physical length, one defines the linear axis resolution mathematically as $$z_{linear} = 1/\rho_{linear}$$

where $$\rho_{linear} = (x_1 - x_0)/l_{linear}$$

is the axis value density. Because the constant over the physical axis resolution $z_{linear}$ is adjusted, it varies from point to point over the axis. Mathematically, the adjustment is described as:

$$z(x) = z_{linear} + f(x)$$

where $f(x)$ denotes the axis resolution modulation function. Further, the axis resolution modulation function $f(x)$ is subject to the following mathematical conditions:

$$\begin{vmatrix} \int_{x_0}^{x_1} f(x)\,dx = 0 \\ \min_{x \in [x_0, x_1]} (f(x)) > -z_{linear} \\ f(x) + z_{linear} \geq z_{target}, x = \{x_{i0}, x_{i1}, \ldots x_{in}\} \end{vmatrix} \quad (1)$$

The first condition preserves the physical axis dimension. The condition is intuitive and represents the fact that, although the axis is stretched, i.e. provides bigger than a $z_{linear}$ resolution in the one or more areas of interest, outside of these areas, the axis must shrink, or provide smaller than $z_{linear}$ resolution in order to keep the axis physical length $l_{linear}$ constant. The second condition puts a limit on how the axis shrinks outside of the one or more areas of interest. It represents the fact, that negative axis resolution does not have well defined meaning, so we steer away from it. The third condition limits the choice of a modulation function, by setting lower limit to the axis resolution sought in the one or more points of interest $x=\{x_{i0}, x_{i1}, \ldots x_{in}\}$.

The conditions presented here may be adjusted, to flex the axis length. For instance a new non-linear axis with length not exceeding $l_{max}$ construction is described by the system:

$$\begin{vmatrix} \int_{x_0}^{x_1} f(x)\,dx = 0 \\ \min_{x \in [x_0, x_1]} (f(x)) > -z_{linear} \frac{l_{max}}{l_{linear}} \\ f(x) + z_{linear} \frac{l_{max}}{l_{linear}} \geq z_{target},\, x = \{x_{i0}, x_{i1}, \dots\, x_{in}\} \end{vmatrix} \quad (2)$$

It is appreciated that when the real estate available for the axis increases, the need for adjustment diminishes as $$z_{linear} \frac{l_{max}}{l_{linear}}$$

approaches the targeted resolution.

The choice of modulation function family for $f(x)$ should not be considered in any way limiting. For illustrative purpose, we use a Gauss function family given by $$f_{a,b,c,\sigma}(x) = ae^{-\frac{(x-b)^2}{\sigma^2}} + c$$

which has four coefficients that need to be determined by a system of three conditions. Among the requirements defined by the user are: resolution of $z_{target}=4$ in a point of interest fixed at $x_{01}=6.5$, and assuming an axis of length $l_{linear}=10$, has minimum and maximum values of 0 and 10 respectively.

The inequalities allow for ranges of coefficient values. Solving the conditions in case of Gauss function requires a numerical iterative approach. Both numerical integration and iterative approaches are well known in the art and can be used by one or more embodiments. For illustrative purposes, the Euler method is used during numerical integration.

Iterations start at $a=4$, $b=6.5$, $c=0$, and $\sigma=1$. The function is rendered as 201. The user indicated point of interest has already fixed the value of b. As result, in this particular family of functions, we can vary a, c and σ, seeking a function that satisfies the three conditions in the system (1). It is apparent the earlier choice of $a=4$ is not a coincidence. We are looking at a targeted minimum resolution of 4, achieved by a $f(x)$ maximum with a value greater than or equal to 3 (system (1), third condition). At the same time, given the axis definition, the modulating function $f(x)$ may not have minimum value less than or equal to $-1$ (system (1), second condition). Choosing $a=4$ is to produce a resolution of 4 or better considering the $f(x)$ minimum constraint.

Euler's 64 step numerical integration 202 produces $$\int_0^{10} 4e^{-(x-6.5)^2}\,dx = 7.089.$$

In the next iteration we need to adjust c in order to make the integral close to zero. A value from the (0,1) interval is preferably selected. After numerical integration, further adjustments can be made to c until the integral produces a value close to zero. In certain arrangements a choice can be made between different iterative approaches well known in the art that are used to numerically solve equations such as the Newton-Raphson method. The choice of the numerical equation solving and numerical integration method does not in any way limit the present embodiment. Additionally, these numerical methods may not be needed in one or more alternative embodiments.

A value of $c=0.708$ satisfies the system's (1) first condition well enough 203, 204. The next step is adjusting the axis tickmarks 209 and labels (not shown), so that they provide visual clues and guide the user in identifying and selecting other points of interest. Assuming n tickmarks in the $[x_0,x_1]$ interval on the original linear scale, the new tickmark and axis label positions are calculated mathematically with $$\int_{x_0}^{x_0 + i\frac{x_1 - x_0}{n-1}} (f(x) + z_{linear})\,dx,\, i = \{0, 1, 2, \dots, n\} \quad (3)$$

The result in the particular Gauss function case is 210. The tickmarks positions were calculated by $$\int_0^a \left( \left(4e^{-(x-6.5)^2} - 0.708\right) + 1 \right) dx,\, a = \{0, 1, 2, \dots, 10\}$$

On the graph, it is seen that the new nonlinear axis, between 6 and 7, contains 4 distinct tickmarks from the original linear axis 206. The result indicates resolution better than 4 has been achieved with the particular modulation function near the point of interest and the targeted resolution requirement has been satisfied. Further, using one or more nonlinear resolution modulation function(s) allowed maintaining of the original axis physical dimensions.

Upon user selecting a new point of interest, in certain arrangements the value selected may need determined, so data point extraction commences. In one or more other embodiments, the value may be determined by solving the $$\int_{x_0}^{x_0 + x_{selected}} (f(x) + z_{linear})\,dx = l_{selected}$$

with respect to $X_{selected}$. In one or more embodiments the equation may not be solved analytically. In the latter case, well known in the art, linear or higher order interpolation may be used.

The new selection may effectively move the focal point 207. While in certain embodiments moving the focal point is likely to require constructing a new resolution modulation function $f(x)$, in other embodiments such an operation will not be required. If the new point is in the neighborhood (that is, in close proximity to) of a previous point of interest, the resolution at the new point of interest can be close to or above the desired resolution. In such a situation, the current nonlinear axis can be maintained, thus avoiding unneeded calculations. Otherwise, the above outlined should be repeated and a new resolution modulation function $f(x)$ should be located/determined that satisfies the latest requirements.

Figure 3:
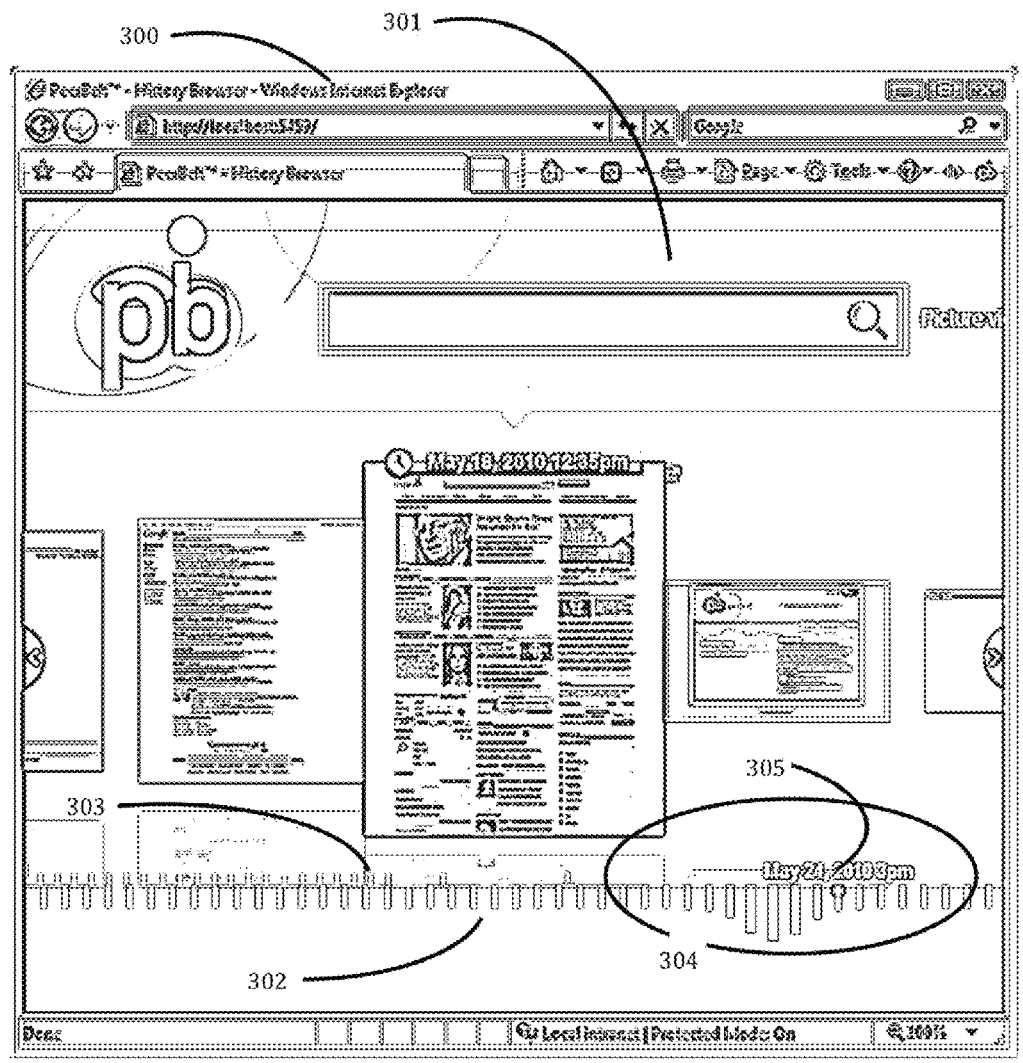
FIG. 3 shows a non-linear graph presented by one embodiment where the system comprises of a script and trapezoid like modulation function family.

In alternative embodiment as depicted in FIG. 3, an example of a fixed length graph with a nonlinear axis and on-demand resolution 303 is used to unfold and navigate total of more than three years (1095 days) of browsing history data on a screen with no more than 768 pixels available. With no a priori knowledge of the browsing history distribution, uniform distribution is assumed. Considering each day in 2 hour segments amounts to about 13,000 data points (options) to choose from. In this example, the number of options is 17 fold the number of pixels available. By shrinking the axis in the areas away from the current focus, and expanding the areas where the focus is 304, the present invention is able to squeeze 13,000 options on 768 pixel nonlinear axis. Unfolding any single option available, requires not more than two to three focused clicks. The present embodiment preferably uses script in an HTML page 301 that can be executed/presented in a web browser 300. In the area of focus 304, to the right of the focal point, the resolution is above the preset 2 hour threshold, as suggested by the label 305 configured to display time portion only in case the resolution is above the threshold.

Alternative embodiments can refer to a simpler resolution modulation family of functions. Such embodiments can utilize a step family of functions such as:

$$f(x) = \begin{cases} y_0, & x < a \\ y_1, & a \leq x < b \\ y_2, & x \geq b \end{cases}$$

These function families allow for analytically solving the systems (1) or (2) with respect to coefficients a and b. Analytical solutions lead to easy and efficient axis transformations. The present embodiment is ideal for displaying archived data, where the significance of data diminishes over time and/or there is a weak link between current and old data.

An alternative embodiment uses a trapezoid resembling modulation function:

$$f(x) = \begin{cases} y_0, & x < a \\ y_0 + \alpha \frac{x-a}{b-a}, & a \leq x < b \\ y_0 + \alpha, & b \leq x < c \\ y_0 + \alpha - \alpha \frac{x-c}{d-c}, & c \leq x < d \\ y_0, & x \geq d \end{cases}$$

Such a modulation function family allows for analytical solutions. At the same time it has some resemblance to the Gauss function. In any event the present function family allows for a gradual resolution increase to and gradual decrease away from a point of interest. Since the resolution is constant in the plateau, selecting a new focal point on the plateau needs no new modulation function. The above referenced embodiment would preferably take precedence over the initial browsing history navigation embodiment based on Gauss function presented on FIG. 3.

Alternative embodiments of the present invention can include displaying years of photo, news or browsing data on a mobile device screen, such as those with a width of no more than 480 or 640 pixels, for example.

In alternative embodiments, a nonlinear scale axis with on-demand resolution is used in unfolding and navigating hi-resolution geographic data, general purpose maps, and/or games by zooming into the area of interest, without losing sight of the entire dataset.

The various embodiments of the invention can be easily integrated with modern graphical interfaces, allowing for seamless user experience. Being able to unfold a point of interest with one or more focused selections, without losing sight of the entire dataset or getting disoriented by frequent scrolling, results in a vastly improved user experience. The referenced embodiments allow navigating relatively large datasets (such as those with a few thousand data points) even on small devices such as smart phones or PDAs.

Figure 4:
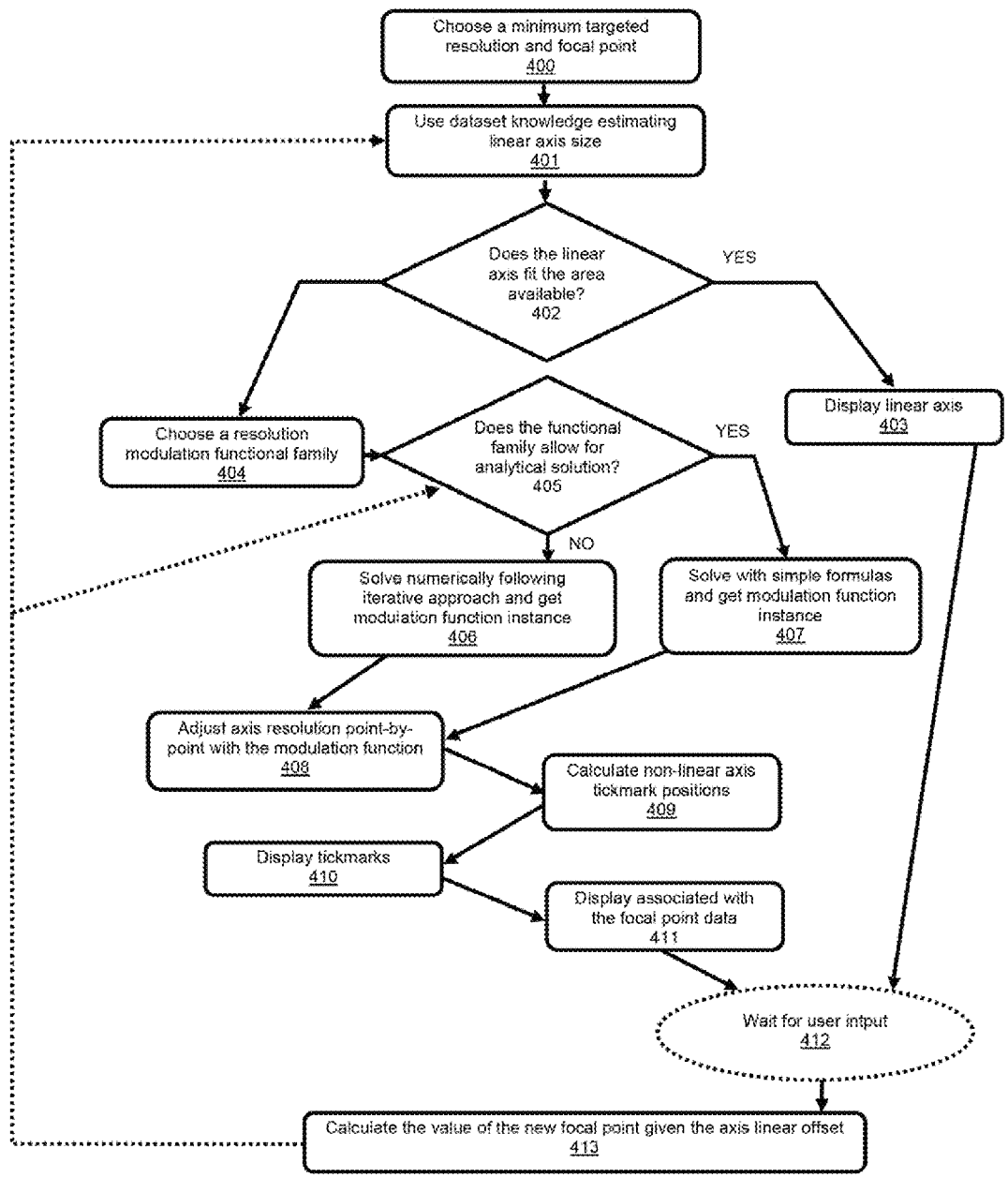
FIG. 4 illustrates the process of choosing between linear and non-linear unfolding type of axis and the process of adjusting the axis resolution and visual appearance.

FIG. 4 illustrates a method and process of choosing between linear and non-linear data unfolding type of axis and a method and process of converting to a fixed size, non-linear axis with variable resolution. At step 400, the user and/or the system selects a minimum targeted resolution near the focus. The choice of focal point at this point is optional. In certain embodiments a default value can be used. Using a priori dataset knowledge and/or making assumptions based on expected dataset density for instance, the system estimates the size of a linear axis that will allow for navigating the complete dataset while satisfying the minimum resolution demand (step 401). In case sufficient real estate is available, the system draws the linear axis as in step 403. Otherwise from logical block 402 the method proceeds to 404, where the user is given the option of choosing between various modulation function families. In case the family of choice comes with preset analytical solutions, a simple calculation 407 produces the coefficients of the actual modulation function instance. Otherwise, a numerical iterative approach can be used to derive the coefficients 406. Either solution revolves around focal point, targeted resolution near the focal point and dataset length assumptions and/or knowledge. Once the modulation function instance is available (coefficients are resolved), the axis is adjusted 408 by calculating a resolution point-by-point with the modulation functions and the base linear resolution. Tickmark position is determined at step 409. Tickmarks considered essential are displayed at 410. The data currently in focus is extracted at 411. The actual data extraction procedure is assumed to be generic and is well known to those of skill in the art. Once the data is displayed, the system waits at 412 for user input. Upon a new focal point selection, the value of the new focal point is calculated at 413, preferably with the precision allowed by the resolution at the point selected. It is optional where the control flow returns from here. All the steps can essentially be repeated at this point. However, since the choice of functional family and targeted resolution have already been made, it should be understood that one or more steps can be skipped. This means going back to at least one of steps 405, 406 or 407, depending on how much information the system retained from the previous run.

Although the description contains many examples and specific mentions, these should not be considered as limiting the scope of the embodiments, but as merely providing illustrations of some of the presently preferred embodiments. For example, the family of resolution modulation function can be defined with other common sense expressions. Support for two or more focal points can be introduced. Superposition of modulation functions can be used when dealing with multiple focal points. Different coefficient values give different size high-resolution areas and different low-resolution areas. The coefficient values can generally be user fitted. In addition, high resolution medical or natural science time series can be easily unfolded and navigated even on small screen field or portable devices. Two dimensional modulation functions can allow unfolding data close to points of interest on a plane, while the rest of the information remains in sight. Consider navigating a map for instance. Games may benefit from one or multidimensional dimensional unfoldings as well.

Thus the scope of the embodiments should be determined by the appended claims and their legal equivalents, rather than by the examples discussed.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system having a processor and a memory accessible by the processor, the system configured to build one or more fixed length axes, the axes having a continuously non-linear axis resolution and on-demand axis resolution at one or more points and being capable of unfolding one or more datasets stored in the memory, the system comprising:
   one or more integrable function families stored in the memory; and
   a client application stored in the memory that, when executed by the processor, configures the system to:
      capture or evaluate one or more data unfold axis resolution requirements;
      capture one or more physical dimension requirements of an axis;
      analyze one or more foreput requirements; and
      construct in the memory one or more continuously non-linear integrable axis resolution modulation functions that satisfy one or more combinations of the requirements, provided one or more integrable function families, wherein the one or more continuously non-linear integrable axis resolution modulation functions modulate the axis resolution of the one or more fixed length axes having a continuously non-linear axis resolution and on-demand axis resolution at one or more points.

2. The system of claim 1, wherein the client application comprises a browser plug-in.

3. The system of claim 1, wherein the client application comprises a script.

4. The system of claim 1, wherein the client application comprises a browser.

5. The system of claim 1, wherein the client application comprises a standalone application.

6. The system of claim 1, wherein the client application comprises an application plug-in.

7. The system of claim 1, wherein the client application is further configured to:
   utilize one or more iterative numerical methods while constructing the one or more continuously non-linear axis resolution modulation functions.

8. The system of claim 1, wherein the client application is further configured to:
   utilize in memory one or more analytical formulas while constructing the one or more continuously non-linear axis resolution modulation functions.

9. The system of claim 1, wherein the client application is further configured to:
   utilize in memory one or more data dictionaries while constructing the one or more continuously non-linear axis resolution modulation functions.

10. The system of claim 1, wherein the client application is further configured to:
   adjust the resolution of the one or more graph axis in a point-by-point fashion by modulating the axis resolution in the memory with the one or more integrable axis resolution modulation functions.

11. The system of claim 10, wherein the client application is further configured to:
   adjust one or more linear axis tickmarks underlying positions in memory to reflect a variation from point-to-point axis resolution;
   render the one or more tickmarks; and
   provide a visual aid to the user based on the tickmarks.

12. The system of claim 1, wherein the client application is further configured to:
   determine a value selected on the axis given a linear offset of a selection point over the axis.

13. The system of claim 12, wherein the client application is further configured to:
   readjust one or more axes, based on the selection value and the data unfold axis resolution requirements and the axis' physical dimension requirements.

14. A computer-implemented method for building with a computing device executing a client application one or more fixed length axes having a continuously non-linear axis resolution and on-demand axis resolution at one or more points, and being capable of unfolding one or more datasets, the computing device having a processor and memory storing the client application, the method comprising:
   capturing or evaluating one or more data unfold resolution requirements;
   capturing one or more axis physical dimension requirements;
   analyzing with the processor one or more foreput requirements; and
   constructing an instance of one or more continuously non-linear integrable axis resolution modulation functions that satisfy one or more combinations of the captured requirements, provided one or more families of integrable functions, wherein the one or more continuously non-linear integrable axis resolution modulation functions modulate the axis resolution of the one or more fixed length axes having a continuously non-linear axis resolution and on-demand axis resolution at one or more points.

15. The method of claim 14, wherein the client application comprises a browser plug-in.

16. The method of claim 14, wherein the client application comprises script.

17. The method of claim 14, wherein the client application comprises a browser.

18. The method of claim 14, wherein the client application comprises a standalone application.

19. The method of claim 14, wherein the client application comprises an application plug-in.

20. The method of claim 14 further comprising:
   utilizing one or more iterative numerical methods while constructing the one or more continuously non-linear integrable axis resolution modulation functions.

21. The method of claim 14 further comprising:
   utilizing one or more analytically derived formulas while constructing the one or more continuously non-linear integrable axis resolution modulation functions.

22. The method of claim 14 further comprising:
   utilizing one or more data dictionaries, while constructing the one or more continuously non-linear integrable axis resolution modulation functions.

23. The method of claim 14, wherein the resolution of the one or more axes is adjusted in a point-by-point fashion by modulating an axis' resolution with the one or more continuously non-linear integrable axis resolution functions.

24. The method of claim 23, further comprising:
adjusting one or more underlying linear axis tickmark positions to reflect a variance in point-to-point axis resolution;
rendering one or more tickmarks; and
providing a visual aid to a user.

25. The method of claim 14, wherein the client application determines the value selected on the axis given a linear offset of the selection point over the axis.

26. The method of claim 25, wherein the client application readjusts one or more axes, based on the selection value and the one or more data unfold axis resolution requirements and the one or more axis physical dimension requirements.

27. A non-transitory computer-readable medium containing instructions executable by a processor for performing a method for building one or more fixed length axes having a continuously non-linear axis resolution and on-demand axis resolution at one or more points, and being capable of unfolding one or more datasets, the method comprising:
capturing or evaluating one or more data unfold resolution requirements;
capturing one or more axis physical dimension requirements;
analyzing one or more foreput requirements; and
constructing at least one instance of one or more continuously non-linear integrable axis resolution modulation functions that satisfy one or more combinations of the requirements, provided one or more families of integrable functions, wherein the one or more continuously non-linear integrable axis resolution modulation functions modulate the axis resolution of the or more fixed length axes having a continuously non-linear axis resolution and on-demand axis resolution at one or more points.

28. The non-transitory computer-readable medium of claim 27, containing instructions utilizing one or more iterative numerical methods while constructing the one or more continuously non-linear integrable axis resolution modulation functions.

29. The non-transitory computer-readable medium of claim 27, containing instructions utilizing one or more analytically derived formulas while constructing the one or more continuously non-linear integrable axis resolution modulation functions.

30. The non-transitory computer-readable medium of claim 27, containing instructions utilizing one or more data dictionaries, while constructing the one or more continuously non-linear integrable axis resolution modulation functions.

31. The non-transitory computer-readable medium of claim 27, containing instructions to adjust the resolution of one or more graph axes in a point-by-point fashion by modulating the axis resolution with one or more continuously non-linear integrable axis resolution modulation functions.

32. The non-transitory computer-readable medium of claim 31, wherein the method further comprises:
adjusting one or more underlying linear axis tickmark positions, to reflect a variance in point-to-point axis resolution;
rendering one or more axes tickmarks; and
providing a visual aid to orient a user.

33. The non-transitory computer-readable medium of claim 27, containing instructions for determining the value selected on the axis given a linear offset of the selection point over the axis.

34. The non-transitory computer-readable medium of claim 33, wherein the method comprises further readjusting the one or more axes, based on the selection value and the one or more data unfold resolution requirements and the one or more axis physical dimension requirements.

* * * * *